Patented Sept. 3, 1946

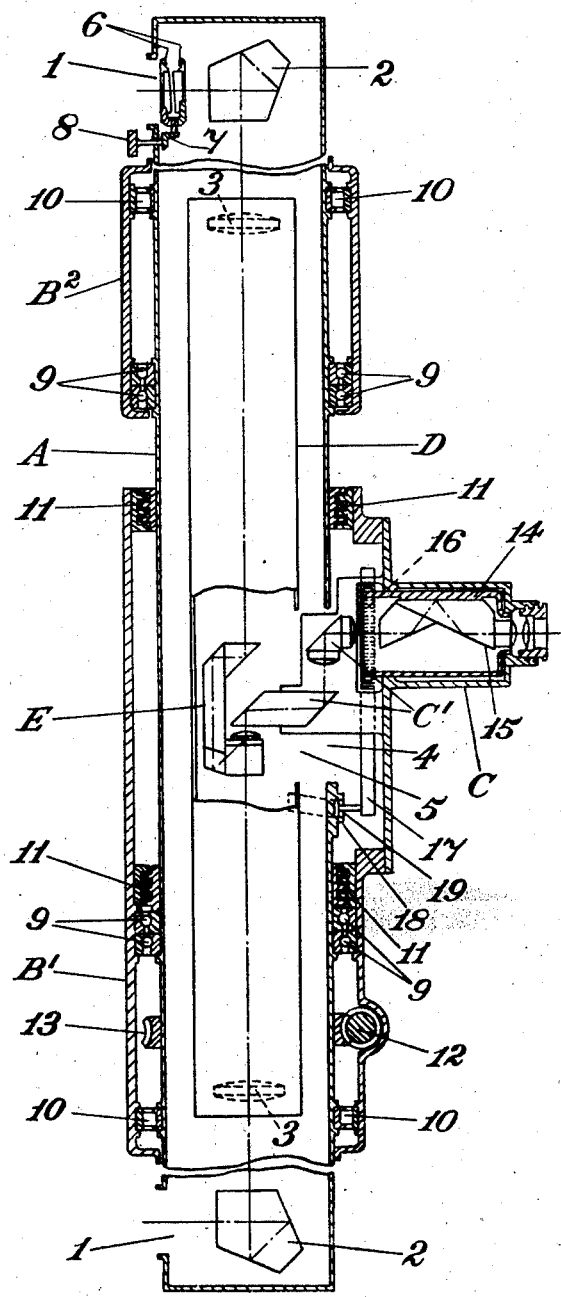

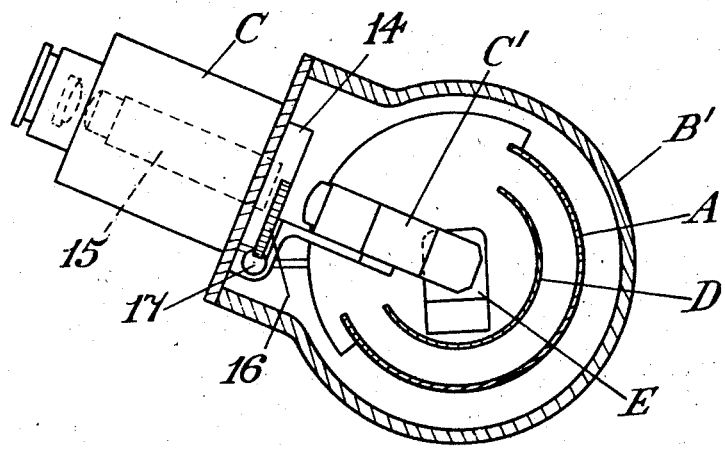
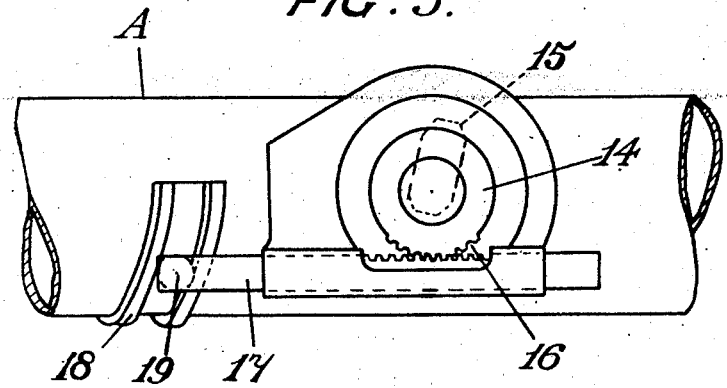

2,407,186

UNITED STATES PATENT OFFICE 2,407,186

RANGE FINDER, HEIGHT FINDER, AND LIKE MEASURING INSTRUMENT

John Martin Strang and Claud Foster, Glasgow, Scotland, assignor to Barr & Stroud, Limited, Glasgow, Scotland Application December 1, 1944, Serial No. 566,221
In Great Britain March 14, 1941

5 Claims. (Cl. 88—2.7)

This invention relates to rangefinders, heightfinders, and like optical measuring instruments of the self-contained base type, hereinafter referred to as rangefinders. Such instruments comprise a tubular base casing, light entrance windows, one at or near each end of the base casing, and two end reflectors within the base casing, to receive light entering through the windows and to direct it along the base casing by way of an objective to a central reflecting system at or near the middle of the base casing. The central reflecting system then directs the two beams of light at or approximately at right angles to the base to an eyepiece or to binocular eyepieces, there being in one or both beams of light a movable light deviating prism element by movement of which measurement is effected.

The invention is concerned with what may be termed fixed eyepiece rangefinders, i. e. instruments in which the eyepiece (or eyepieces) remains stationary while the line of sight from the instrument to the object under observation is elevated or depressed, in contradistinction to the type of instrument in which the movement of the instrument necessary for elevation or depression of the line of sight involves corresponding inclinational movement of the eyepiece.

In fixed eyepiece rangefinders, the inclination of certain optical parts relative to other optical parts which remain stationary with the eyepiece ordinarily would have the effect of tilting the images in the field of view. This tilting effect can be annulled by means of a movable erecting prism through which light passes in its path from the central reflecting system to the eyepiece, this erecting prism being rotated at half the angular speed at which the base casing turns in elevating or depressing the line of sight.

The present invention is concerned with means whereby rotation of an erecting prism such as referred to can be conveniently effected.

According to this invention, in a fixed eyepiece rangefinder, the rotation of the base casing in elevating or depressing the line of sight effects rotation of the erecting prism through the medium of a cam device of helical or scroll form (or substantially of that form) the pitch or lead of which is designed to give the necessary relationship between the angular speed of the base casing and that of the erecting prism, viz. two to one. Mechanism of this nature can be incorporated compactly and conveniently into the rangefinder structure.

In carrying the invention into practice, the arrangement may comprise a helical or scroll cam guide located on and turning with the base casing, being coaxial therewith, and an actuating member which is movable parallel with the said axis and engages with the cam guide so as to be moved by rotation of the said guide, so operating the erecting prism.

The invention will now be described with reference to the accompanying drawings, in which:

Figure 1 is a sectional plan view of a rangefinder,

Figure 2 is a sectional view at right angles to the axis of the instrument, and

Figure 3 is a sectional view through the eyepiece mounting.

The figures show a rangefinder comprising a tubular base casing A, an outer tubular bearing composed of two parts $B^1$, $B^2$, in which the base casing A is rotatable about its axis, and an eyepiece mounting C carried by and projecting from the outer bearing $B^1$.

The tubular base casing A has light entrance windows 1, one at each end, and end pentagonal prisms 2, and within the base casing A there is an inner frame tube D which carries objectives 3. At a central position there is a central reflecting prism combination E also carried by the inner frame tube D. The inner frame D rotates with the base casing A, the base casing A and the inner frame D being apertured at 4 and 5 respectively to permit of light passing from the inner frame D to the eyepiece mounting C. Prisms $C^1$ remain stationary with the eyepiece mounting C. Just within the right hand window 1 there are two measuring prisms 6 which are arranged to be rotated by equal amounts in opposite senses simultaneously by means of bevel gearing 7 operated by an operating head 8. Range measurement is effected by rotation of these prisms 6, the instrument being of coincidence type.

The base casing A is rotatable in ball and roller bearings 9 and 10, and the interior of the instrument is sealed from the outer atmosphere by labyrinth arrangements 11 of annular form, one on each side of the apertures 4 and 5.

A worm shaft 12 operated by an operating head, not shown, passes through the bearing $B^1$ and engages with a worm wheel 13 fitted around the base casing A and serves to turn the base casing A about its axis for elevation and depression of the line of sight, the eyepiece mounting C and associated parts remaining stationary.

In order to prevent tilting of the images, the following arrangement is adopted. Within the eyepiece mounting C there is a cylindrical prism carrier 14 which carries an erecting prism 15 of the shape shown. Prism carrier 14 is rotatable in the eyepiece mounting C about the axis of the eyepiece and at its end remote from the eyepiece has a circular rack 16. A rod or bar 17 is supported so as to be capable of sliding transversely relative to the axis of the eyepiece and has a rack part which engages with the circular rack 16. On the outside wall of the tubular base casing A there is a helical or scroll shaped cam guide 18 and the rod 17 has a roller 19 which engages with the cam guide 18.

These parts are so designed that, as the base casing A is turned about its axis, the prism carrier 14 and erecting prism 15 are turned about the axis of the eyepiece at half the angular speed of the base casing.

We claim:

1. A fixed eyepiece rangefinder comprising a bearing, a base casing which is rotatable in the bearing for varying the elevation of the line of sight, an eyepiece fixedly carried by the bearing, a prism combination fixed in position relative to the bearing to receive light from the base casing and transmit it through an aperture provided in the base casing to the eyepiece, an erecting prism carried by the bearing between the prism combination aforesaid and the eyepiece and through which the light is directed in its path from the prism combination to the eyepiece, a carrier for said erecting prism, said carrier being rotatable relative to the bearing, and scroll cam mechanism connecting the base casing with said carrier to rotate said carrier and erecting prism from said base casing at half the angular speed of rotation of said casing, said scroll cam mechanism including a scroll-shaped cam rotatable about the axis of the scroll and a linearly movable member engaging with said cam for the transmission of motion from said casing to said carrier.

2. A fixed eyepiece rangefinder comprising a bearing, a base casing which is rotatable in the bearing for varying the elevation of the line of sight, an eyepiece fixedly carried by the bearing, a prism combination fixed in position relative to the bearing to receive light from the base casing and transmit it through an aperture provided in the base casing to the eyepiece, an erecting prism carried by the bearing between the prism combination aforesaid and the eyepiece and through which the light is directed in its path from the prism combination to the eyepiece, a carrier for said erecting prism, said carrier being rotatable relative to the bearing, a scroll-shaped cam located co-axially on and turning with the base casing, an actuating member engaging with said cam so as to be moved linearly on rotation of said cam, and means for converting linear movement of the actuating member into rotational movement of the carrier at half the angular speed of rotation of the base casing.

3. A fixed eyepiece rangefinder comprising a bearing, a base casing which is rotatable in the bearing for varying the elevation of the line of sight, an eyepiece fixedly carried by the bearing, a prism combination fixed in position relative to the bearing to receive light from the base casing and transmit it through an aperture provided in the base casing to the eyepiece, an erecting prism carried by the bearing between the prism combination aforesaid and the eyepiece and through which the light is directed in its path from the prism combination to the eyepiece, a carrier for said erecting prism, said carrier being rotatable relative to the bearing, a scroll-shaped cam located on the outside of the wall of the base casing co-axially with and turning with said base casing, a guide on the bearing, a rod slidable linearly in said guide, the rod engaging with the cam so as to be moved linearly on rotation of the base casing, a straight rack on said rod, and a circular rack on said carrier engaging with said straight rack to convert linear movement of the rod into rotational movement of the carrier at half the angular speed of rotation of the base casing.

4. A fixed eyepiece rangefinder comprising a bearing, a base casing which is rotatable in the bearing for varying the elevation of the line of sight, an eyepiece mounting of tubular form fixed on and projecting from said bearing at right angles to the axis of rotation of the base casing, an eyepiece carried by said eyepiece mounting, a prism combination fixedly carried by said bearing in position to receive light from the base casing and transmit it through an aperture provided in the base casing to the eyepiece, a carrier rotatable within the eyepiece mounting, an erecting prism mounted in said carrier for rotation therewith and through which the light from the prism combination passes in its path to the eyepiece, and scroll cam mechanism connecting the base casing with said carrier to rotate said carrier and erecting prism from said base casing at half the angular speed of rotation of the base casing, said scroll cam mechanism including a scroll-shaped cam rotatable about the axis of the scroll and a linearly movable member engaging with said cam for the transmission of motion from said casing to said carrier.

5. A fixed eyepiece rangefinder comprising a bearing, a base casing which is rotatable in the bearing for varying the elevation of the line of sight, an eyepiece mounting of tubular form fixed on and projecting from said bearing at right angles to the axis of rotation of the base casing, an eyepiece carried by said eyepiece mounting, a prism combination fixedly carried by said bearing in position to receive light from the base casing and transmit it through an aperture provided in the base casing to the eyepiece, a carrier rotatable within the eyepiece mounting, an erecting prism mounted in said carrier for rotation therewith and through which the light from the prism combination passes in its path to the eyepiece, a scroll-shaped cam located on the outside of the wall of the base casing co-axially with and turning with said base casing, a guide on the bearing, a rod slidable linearly in said guide, the rod engaging with the cam so as to be moved linearly on rotation of the base casing, a straight rack on said rod, and a circular rack on said carrier engaging with said straight rack to convert linear movement of the rod into rotational movement of the carrier at half the angular speed of rotation of the base casing.

MARTIN STRANG.
CLAUD FOSTER.